May 19, 1970
S. G. VARGO
3,513,380
LOAD TAP CHANGING TRANSFORMER ARRANGEMENT
WITH CONSTANT IMPEDANCE
Filed June 19, 1968
2 Sheets-Sheet 1
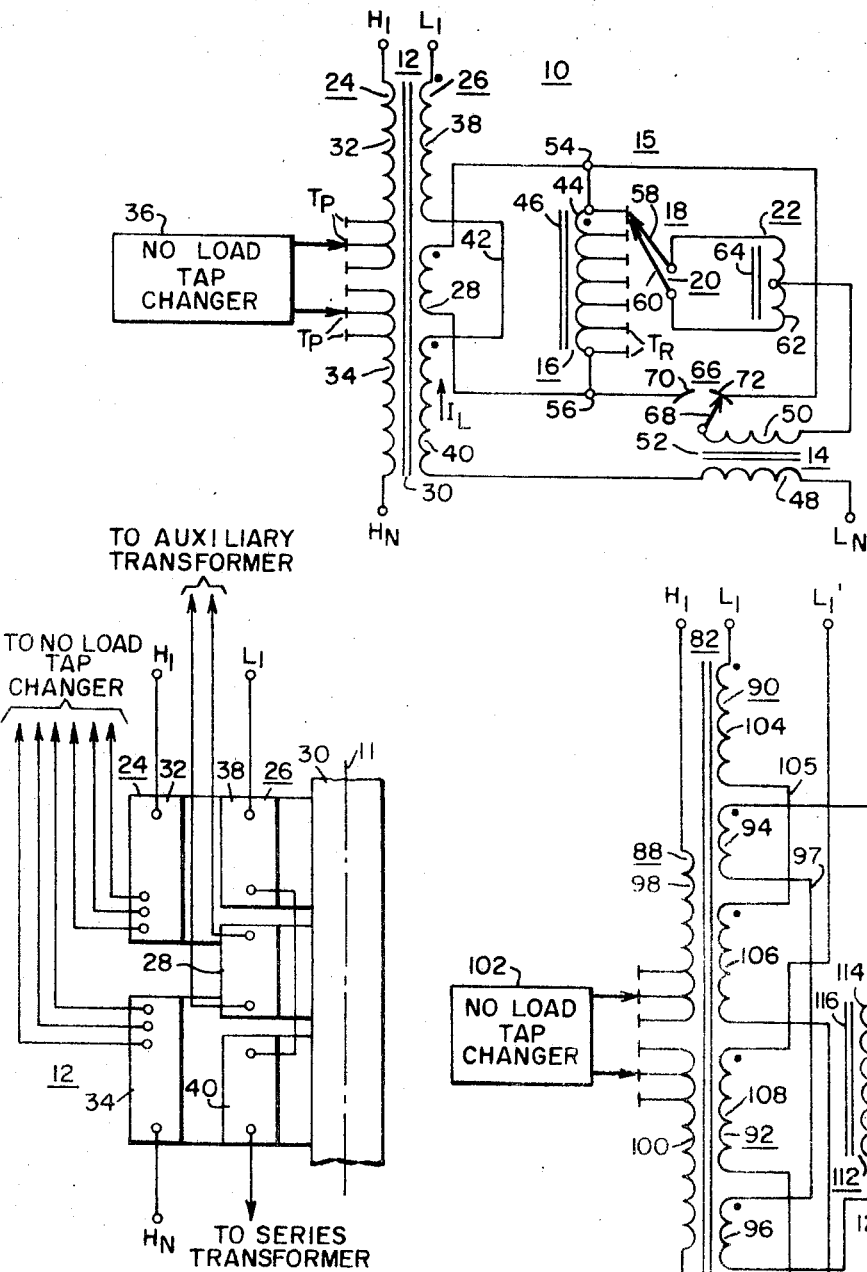
FIG.1.
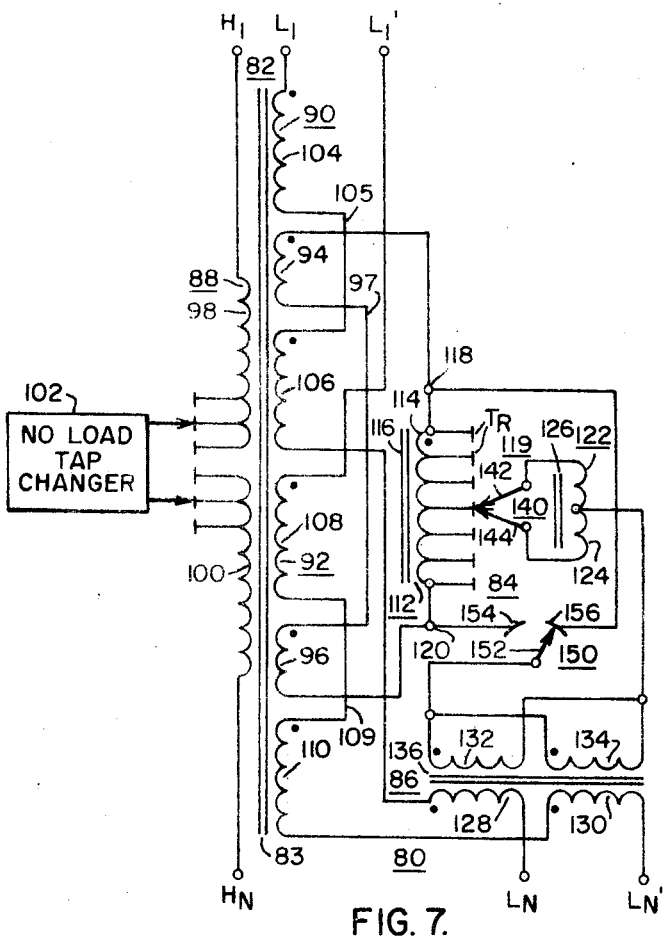
FIG.2.
FIG.7.
WITNESSES:
Bernard R. Gregway
James F. Young
INVENTOR
Stephen G. Vargo
BY Donald R. Lackey
ATTORNEY United States Patent Office 3,513,380
Patented May 19, 1970

3,513,380
LOAD TAP CHANGING TRANSFORMER ARRANGEMENT WITH CONSTANT IMPEDANCE
Stephen G. Vargo, Campbell, Ohio, assignor to Westinghouse Electric Corporation, Pittsburgh, Pa., a corporation of Pennsylvania
Filed June 19, 1968, Ser. No. 738,295
Int. Cl. G05f 5/00; H02p 13/06
U.S. Cl. 323—43.5                        4 Claims

ABSTRACT OF THE DISCLOSURE

A load tap changing transformer arrangement which electrically changes the effective spacing between two spaced, electrically connected sections of a first winding, in response to a tap change, to maintain a predetermined impedance between the first winding and a second winding, over the tap range.

BACKGROUND OF THE INVENTION

Field of the invention

The invention relates in general to electrical inductive apparatus, such as transformers, and more specifically to load tap changer transformer arrangements.

Description of the prior art

Load tap changer transformers of the prior art, of the type which have a power transformer of the core-form type, and a series transformer excited from an excitation winding on the power transformer core, through a tapped regulating winding of an auxiliary transformer, experience a substantial change in impedance over the tap range. For example, a tap range of ±10 percent will change the impedance of the transformer from $.81Z_n$ to $1.21Z_N$, where $Z_N$ is the impedance of the transformer with the tap changer in its neutral position.

Certain applications, however, require that the impedance of the load tap changer transformer be held substantially constant over the tap range. The impedance change can be substantially reduced by disposing the excitation winding for the series transformer concentrically about the high voltage winding, which structure has the more desirable impedance characteristic of a three winding transformer. This structure, however, increases the outside diameter of each phase winding assembly, which increases the length of the magnetic core, and in turn deleteriously affects the size, weight and cost of the transformer. Further, this arrangement requires an additional high-low insulation space, and presents difficult insulation problems in bringing out the high voltage leads from the high voltage winding, as well as leads from a no-load tap changer connected to the high voltage winding, if one is required by the application.

Thus, it would be desirable to be able to provide a load changer transformer arrangement which has a substantially constant impedance, across the tap changer range, without resorting to disposing the excitation winding for the series transformer concentrically about the high voltage winding.

SUMMARY OF THE INVENTION

Briefly, the present invention is a new and improved load tap changing transformer arrangement, which includes a main or power transformer of the core-form type having concentrically disposed high and low voltage windings. The low voltage winding includes two electrically connected sections, which are axially spaced to provide a predetermined impedance, relative to the high voltage winding. The load tap changing transformer arrangement also includes a series transformer, an auxiliary transformer having a tapped regulating winding, tap changer means adapted to change taps on the regulating winding, and an excitation winding. The excitation winding is disposed in the space between the axially spaced sections of the low voltage winding. The series transformer has a winding connected serially with the low voltage winding, and a winding connected to the excitation winding, through the regulating winding. The current through the excitation winding is responsive to the position of the tap changer means on the regulating winding, with the ampere-turns provided by the excitation winding changing the effective spacing of the two sections of the low voltage winding, to that required to maintain substantially the same impedance for each tap position.

BRIEF DESCRIPTION OF THE DRAWINGS

Further advantages and uses of the invention will become more apparent when considered in view of the following detailed description and drawings, in which:

FIG. 1 is a schematic diagram of a load tap changing transformer arrangement, constructed according to an embodiment of the invention;

FIG. 2 is a functional elevational view, in section, of the power transformer of the load tap changing transformer arrangement shown schematically in FIG. 1;

FIG. 7 is a schematic diagram of a load tap changing transformer arrangement constructed according to another embodiment of the invention.

DESCRIPTION OF THE PREFERRED EMBODIMENTS

Figure 3:
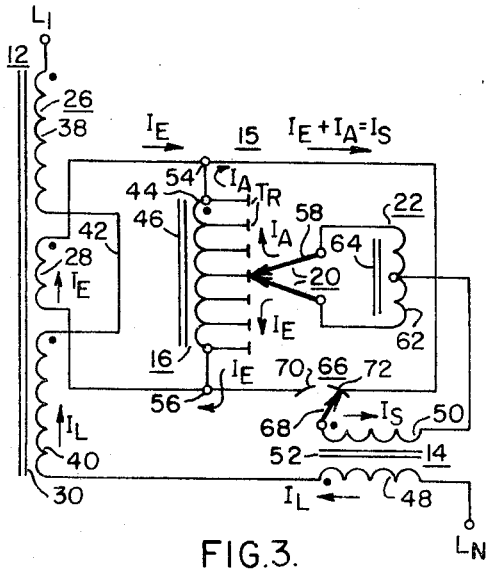
FIGS. 3, 4, 5 and 6 are schematic diagrams which illustrate the operation of the embodiment of the invention shown in FIG. 1.

Referring now to the drawings, and FIG. 1 in particular, there is shown a schematic diagram of a load tap changing transformer arrangement 10, constructed according to an embodiment of the invention. Load tap changing transformer arrangement 10 may be single or polyphase. Since each phase of a polyphase embodiment would be similar, only a single phase is illustrated in order to simplify the drawings.

In general, load tap changing transformer arrangement 10 includes a power or main transformer 12 of the core-form type, a series transformer 14, and regulating means 15. Regulating means 15 includes an auxiliary or regulating transformer 16, and tap changer means 18 having a tap selector switch 20 and a preventive autotransformer 22.

Transformer 12 includes a primary or high voltage winding 24, a secondary or low voltage winding 26, and an excitation winding 28. Transformer 12 is shown in a functional elevational view in FIG. 2, in order to more clearly illustrate the relative locations of its winding assemblies. Since the windings of transformer 12 are symmetrical about a centerline through the leg of their associated magnetic core, only half of the winding assemblies are shown in FIG. 2.

More specifically, the primary and secondary windings are concentrically disposed about a leg of a magnetic core 30. The high voltage winding 24 may be a continuous, or, as shown in FIGS. 1 and 2, it may have first and second sections 32 and 34, respectively, the adjacent ends of which are tapped and interconnected through a no-load tap changer switch 36. The low voltage winding 26 has first and second axially spaced sections 38 and 40, respectively, with the axial spacing being selected to provide a predetermined impedance from the high voltage winding 24 to the low voltage winding 26. The two sections 38 and 40 of the low voltage winding 26 are serially connected via conductor 42.

The excitation winding 28 is disposed in the space between the axially divided low voltage winding 26. The excitation winding 28 provides the excitation voltage for the series transformer 14.

The series transformer 14 includes windings 48 and 50 disposed in inductive relation with a magnetic core 52. Winding 48 is serially connected with the low voltage winding 26, and winding 50 is connected to the excitation winding 28, through regulating means 15 which is adapted to adjust the portion of voltage across the excitation winding 28 which is applied to winding 50 of the series transformer 14.

The auxiliary or regulating transformer 16 of regulating means 15 includes a tapped winding 44 disposed in inductive relation with a magnetic core 46, with winding 44 having terminals 54 and 56 connected to excitation winding 28, and a plurality of tap connections $T_R$. Auxiliary transformer 16 is an autotransformer, which, in conjunction with tap changer means 18 provides the desired voltage to winding 50 of series transformer 14.

Tap changer means 18 includes tap selector switch 20, having tap selector contact arms 58 and 60, and a preventive autotransformer 22 having a center-tapped winding 62 disposed in inductive relation with a magnetic core 64. The ends of windings 62 are connected to the tap selector contact arms 58 and 60, and the tap selector contact arms selectively and sequentially select the desired taps on winding 44. The center tap of winding 62 is connected to one end of winding 50 of the series transformer 14.

In order to extend the regulating range of regulating means 15, the remaining end of winding 50 of series transformer 14 is connected to winding 44 of regulating transformer 16 through a reversing switch 66. Reversing switch 66 has a movable contact arm 68 connected to the remaining end of winding 50, and stationary contacts 70 and 72 connected to terminals 56 and 54, respectively, of winding 44. Thus, the voltage developed across winding 48 of the series transformer 14 will either aid or oppose the voltage across secondary winding 26 of transformer 12, depending upon the position of reversing switch 66; the magnitude of the aiding or opposing voltage will depend upon the tap position selected by the selector switch 20.

Regulating means 15 is shown in the neutral position in FIG. 1, applying zero voltage to winding 50 of the series transformer 14. When the tap changing transformer arrangement 10 is operated as shown in FIG. 1, the output voltage across terminals $L_1$ and $L_N$ of secondary winding 26 will be the voltage across its sections 38 and 40, and since there is no load on the excitation winding 28, there will be no current flowing in the excitation winding 28. The impedance of transformer 12 will be its natural impedance, which was preselected and determined by the physical spacing of the first and second sections 38 and 40 of secondary winding 26.

The operation of the tap changing transformer arrangement 10, in maintaining the output voltage substantially constant while the input voltage to terminals $H_1$ and $H_N$ of high voltage winding 24 varies within a predetermined range, and in maintaining substantially the predetermined natural impedance of the transformer over the regulating range of the regulating means 15, will now be described, using the schematic diagrams shown in FIGS. 3, 4, 5 and 6. FIGS. 3, 4, 5 and 6 illustrate the portion of the schematic diagram shown in FIG. 1 which includes secondary winding 26 of transformer 12, regulating means 15, and series transformer 14.

As hereinbefore stated, when regulating means 15 is in its neutral position, shown in FIG. 1, there will be no current flowing in the excitation winding 28. Now assume that the input voltage to the high voltage winding 24 drops below its rated magnitude, which requires the series transformer 14 to boost the secondary or output voltage of secondary winding 26 a predetermined amount to maintain a constant voltage at the output terminals, but less than the maximum boost available. The reversing switch 68 will be set to cause the voltage developed across winding 48 of the series transformer 14 to aid the voltage across secondary winding 26, with the movable contact arm 68 of the reversing switch contacting stationary contact 72. The tap selector switch 20 will be moved to a predetermined tap position on winding 44, intermediate its ends. Thus, the voltage applied to winding 50 will be that voltage appearing between terminal 54 and the selected tap, with the windings having their ends dotted to indicate like instantaneous polarities. The voltage across winding 48 aid the voltage across secondary winding sections 38 and 40.

When the output voltage is held constant, which keeps the load or kva. constant, while the high voltage input voltage changes, the percent impedance of the transformer will vary with the square of the change of the high voltage. Therefore, since it was assumed that the input voltage dropped in the example of FIG. 3, the natural impedance of the transformer would be increased by the square of the voltage change. This change in the natural impedance of the transformer 12, however, is counteracted, according to the teachings of the invention, by disposing the excitation winding 28 between a divided secondary winding, with the current flow through the excitation winding electrically "opening" or "closing" the physical gap between the divided sections of the secondary winding, depending upon the direction of the current flow through the excitation winding relative to the direction of the current through the secondary winding. The amount of current flow through the excitation winding depends upon the magnitude of the voltage correction provided by the series transformer, and the magnitude of the series transformer correction depends upon the magnitude of the change of the voltage applied to the high voltage winding 24. Therefore, the impedance of the transformer 12 may be artificially or electrically maintained within relatively narrow limits, as the regulating means 15 goes through its tap changing range.

More specifically, as the tap selector switch 20 moves from the position shown in FIG. 1, to the position shown in FIG. 3, current will start to flow through winding 50 of series transformer 14, and the current $I_S$ flowing in winding 50 will divide into two parts $I_A$ and $I_E$, with current $I_A$ flowing toward terminal 54 and current $I_E$ flowing towards terminal 56 and through the excitation winding 28 in the direction of the arrow. Thus, the ampere turns provided by the excitation winding 28 aid the ampere turns of the secondary winding, reducing the affect of the physical gap between the secondary winding sections 38 and 40 on the impedance of the transformer 12. The impedance is reduced by substantially the same amount as it would otherwise increase due to the reduced input voltage, to maintain the effective impedance of the transformer 12 substantially constant.

As the input voltage continues to decrease, and the tap changer selector switch compensates for the decrease by changing taps towards terminal 56, the current through excitation winding 28 will continue to increase and continue to "reduce" the spacing between winding sections 38 and 40, until the tap changer switch 20 reaches the last tap at the end of winding 44 connected to terminal 56. This position, shown schematically in FIG. 4, shorts winding 44, applying the voltage of excitation winding 28 directly across winding 50 of series transformer 14. This position provides the maximum boost to the secondary winding 26, and also provides the maximum ampere turns in the excitation winding 28 for "closing" the gap between the secondary winding sections 38 and 40.

Figure 4:
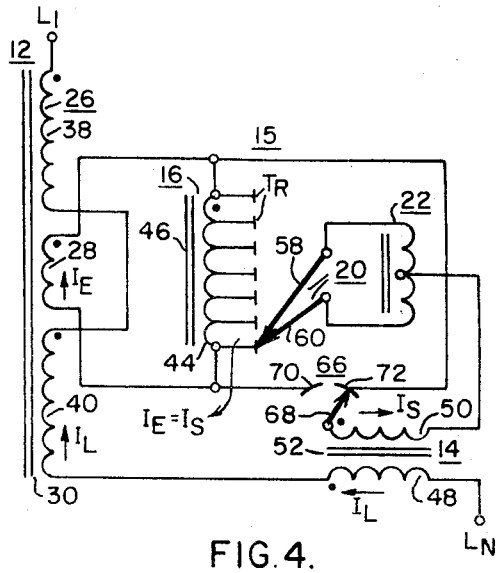
Figure 5:
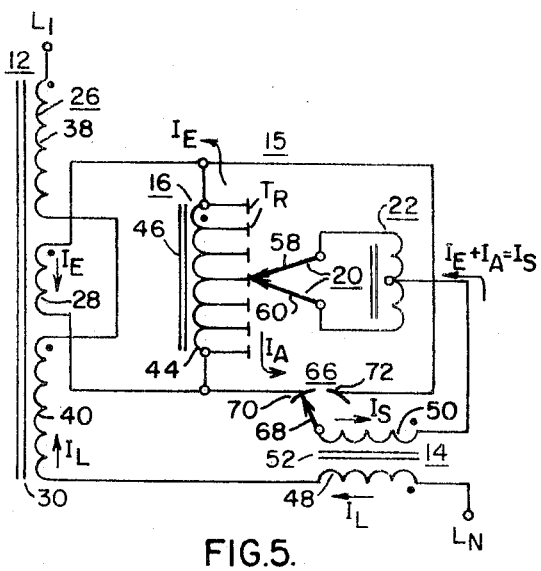
Figure 6:
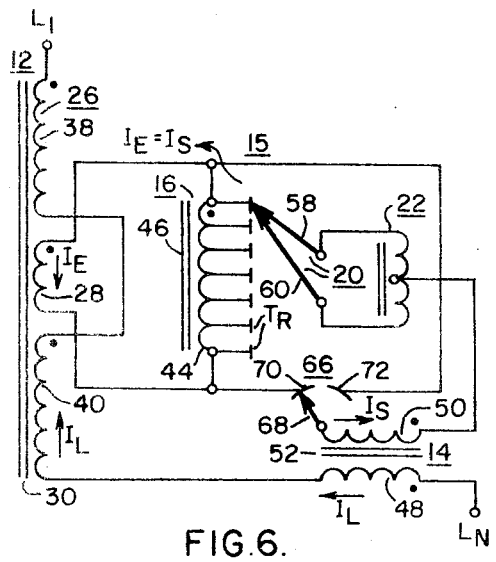

Now, asume that the input voltage applied to high voltage winding 24 is higher than its rated magnitude. Since the voltage developed in winding 48 of series transformer 14 must now oppose or "buck" the voltage of secondary winding 26, the movable contact arm 68 of reversing switch 66 will be moved to stationary contact 70, and, as shown in FIG. 5 the tap selector switch 20 moves to that tap intermediate the ends of winding 44 which will maintain the voltage across terminals $L_1$ and $L_N$ at the predetermined magnitude. When the reversing switch 66 is moved to the position shown in FIG. 5, the intantaneous polarity of the voltage applied across winding 50 is reversed, which causes the polarity of the voltage induced in winding 48 to "buck" the voltage of the secondary winding 26. The current $I_S$ flowing in winding 50, however, still has the same instantaneous direction, as we are still assuming the same instantaneous winding polarities as shown in FIGS. 3 and 4. The current $I_S$ divides the transformer tap selected on winding 44, with the current $I_E$ through the excitation winding 28 now flowing from terminal 54, and the current $I_A$ flowing towards terminal 56. Thus, the direction of current flow through the excitation winding 28 has been reversed by changing the position of the reversing switch, and the ampere turns provided by excitation winding 28 now oppose the ampere turns of the secondary sections 38 and 40, effectively "increasing" the spacing between winding sections 38 and 40. When the input voltage is higher than rated, the transformer impedance is reduced accordingly. The "increasing" of the spacing in the secondary winding sections offsets the natural reduction of impedance, to maintain a substantiallly constant effective transformer impedance.

As the input voltage continues to increase, and the tap changer selector switch 20 moves in the direction of terminal 54, to provide a greater "bucking" voltage to counteract the increase, the current $I_E$ continues to increase in the excitation winding 28. Thus, the effective spacing of the secondary winding sections continues to increase, compensating for the reduction of natural impedance, until the tap changer selector switch 20 reaches the last tap position at the end of the winding 44 connected to terminal 54, as illustrated in FIG. 5. In the tap portion shown in FIG. 5, the regulating winding is shorted, and the full excitation voltage is applied to winding 50. The excitation current $I_E$ is equal to the current $I_S$ flowing in winding 50, as there is no currrent flow through winding 44 of the regulating transformer. The operating position shown in FIG. 5 provides maximum "buck" of the secondary voltage, and the maximum effective spacing of the secondary winding sections 38 and 40.

The teachings of the invention shown in FIGS. 1 through 6 may also be applied to those applications in which the load tap changer transformer provides a plurality of secondary or output voltages, which are all to be held constant by a single regulating winding and tap changer. In this instance, each secondary winding is divided and axially spaced, and an excitation winding disposed in the space provided in each secondary winding. The excitation windings are serially connected across the regulating or auxiliary transformer. FIG. 7 is a schematic diagram which illustrates a dual output voltage embodiment of these teachings.

More specifically, FIG. 7 is a schematic diagram of load tap changer apparatus 80, which includes a power or main transformer 82, regulating means 84, and a series transformer arrangement 86. Power transformer 82 includes a primary winding 88, first and second secondary windings 90 and 92, and first and second excitation windings 94 and 96, all disposed in inductive relation with a magnetic core 83. While transformer 82 is shown as being single phase, it will be understood that it may also be polyphase, as each phase would be similar.

The high voltage winding 88 may be axially divided into two sections 98 and 100, the adjacent ends of which are tapped and interconnected via a no-load tap changer switch 102. In this embodiment, as well as the embodiment shown in FIG. 1, the physical spacing between the taps of the two high voltage winding sections is predetermined such that changes in the gap or spacing of the high voltage sections, due to no-load tap changes, has the minimum effect on the impedance of the transformer. For example, in the nominal position of the no-load tap changer, the gap or spacing may be selected to be 4 inches, with spacing of 2 inches and 6 inches being provided at the two extreme settings of the no-load tap changer.

Each low voltage winding is divided into two sections, which are axially spaced, and the low voltage windings are axially spaced from one another. Thus, the first low voltage winding 90 may be divided into first and second sections 104 and 106, respectively, which are axially spaced a predetermined dimension, and electrically connected via conductor 105. The first excitation winding 94 is disposed between sections 104 and 106.

In like manner, the second low voltage winding 92 is divided into first and second sections 108 and 110, which are axially spaced a predetermined dimension, and electrically connnected via conductor 109.

The series transformer arrangement 86 may be a single transformer having windings 128, 130, 132 and 134 disposed on a common magnetic core 136, as shown, or a separate two winding series transformer may be used for each secondary voltage. Winding 128 of series transformer 86 is serially connected with the first secondary winding 90, and winding 130 of series transformer 86 is serially connected with secondary winding 92.

Windings 132 and 134 of series transformer 86 are connected in parallel with one another, and to the regulating means 84.

Regulating means 84 includes an auxiliary or regulating transformer 112 having a tapped winding 114 disposed on a magnetic core 116, with winding 114 having teerminals 118 and 120 and a plurality of taps $T_R$. The first and second excitation windings 94 and 96 are serially connected via conductor 97, and the series circuit is connected across winding 114 at terminals 118 and 120.

Tap changer means 119, including a tap selector switch 140 and a preventive autotransformer 122, is connected from winding 114 to one side of the parallel connected windings 132 and 134. Preventive autotransformer 122 includes a center-tapped winding 124 disposed on a magnetic core 126, and tap selector switch 140 includes tap selector arms 142 and 144 connected to the ends of windings 122. The centertap of winding 124 is connected to one end of the parallel connected windings 132 and 134 of the series transformer 86.

Terminals 118 and 120 of winding 114 are connected to a reversing switch 150, which includes a movable contact arm 152 and stationary contacts 154 and 156. Terminals 118 and 120 are connected to stationary contacts 156 and 154, respectively, and the movable contact arm 152 is connected to the remaining side of the parallel connected series transformer windings 132 and 134.

Regulating means 84 changes taps to maintain a constant voltage across terminals $L_1$ and $L_N$, and across terminals $L_1'$ and $L_N'$, of the first and second secondary windings 90 and 92, respectively, in response to changes in the voltage applied across terminals $H_1$ and $H_N$ of the high voltage winding 88. In this embodiment, as well as in the embodiment shown in FIG. 1, the tap changes may be made manually by an operator, or automatically in response to a voltage sensing device of any suitable type.

In addition to maintaining a constant voltage output at the output terminals of the two secondary windings, the impedance of transformer 82 is held substantially constant, over the range of the regulating means 84, through the compensating action of the ampere-turns provided by the excitation windings 94 and 96, which effectively decrease the spacing of the sections of their associated secondary winding when the input voltage to winding 88 decreases, to offset the natural increase in transformer impedance, and which effectively increase the spacing of the sections of their associated secondary winding when the input voltage to winding 88 increases, to offset the natural decrease in transformer impedance.

A three-phase transformer was constructed according to the teachings of the invention shown in FIG. 7 and the percent impedance determined for five tap settings of the load tap changer, for each of three settings of the no-load tap changer switch 102 in the high voltage winding 88. The results of this test, with all values pertaining to a 11,250 kva. base, are listed in the following table:

| Primary voltage | Secondary voltage | No-load tap changer position | Load tap changer position | Percent impedance at 75° C. | |
|---|---|---|---|---|---|
| | | | | Output #1 | Output #2 |
| 141,900 | 4,160 | I | 16—Lower | 5.20 | 5.19 |
| 135,450 | 4,160 | I | 8—Lower | 5.24 | 5.21 |
| 129,000 | 4,160 | I | Neutral | 5.33 | 5.27 |
| 122,550 | 4,160 | I | 8—Raise | 5.28 | 5.22 |
| 116,500 | 4,160 | I | 16—Raise | 5.19 | 5.14 |
| 135,300 | 4,160 | II | 16—Lower | 5.20 | 5.12 |
| 129,150 | 4,160 | II | 8—Lower | 5.25 | 5.17 |
| 123,000 | 4,160 | II | Neutral | 5.26 | 5.20 |
| 116,850 | 4,160 | II | 8—Raise | 5.21 | 5.19 |
| 110,700 | 4,160 | II | 16—Raise | 5.17 | 5.14 |
| 128,700 | 4,160 | III | 16—Lower | 5.10 | 5.10 |
| 124,313 | 4,160 | III | 8—Lower | 5.08 | 5.06 |
| 117,000 | 4,160 | III | Neutral | 5.22 | 5.19 |
| 111,150 | 4,160 | III | 8—Raise | 5.20 | 5.17 |
| 105,300 | 4,160 | III | 16—Raise | 5.16 | 5.14 |

In summary, there has been a disclosed a new and improved load tap changing transformer arrangement, which maintains a substantially constant impedance over the regulating range of the apparatus. The impedance regulation has been accomplished without increasing the radical dimension of the phase windings, and without creating an additional high-low insulation space. The high voltage winding is easily accessible, facilitating the bringing out of the high voltage leads, as well as taps for a no-load tap changer.

Since numerous changes may be made in the above described apparatus, and different embodiments of the invention may be made without departing from the spirit thereof, it is intended that all matter contained in the foregoing description, or shown in the accompanying drawings shall be interpreted as illustrative, and not in a limiting sense.

I claim as my invention:
1. A load tap changing transformer arrangement, comprising:
   a magnetic core,
   a plurality of electrical windings, including in primary winding and a first secondary winding, disposed in inductive realtion with said magnetic core,
   said first secondary winding having first and second serially connected sections, axially spaced to provide a predetermined impedance relative to said primary winding,
   means adapted to adjust the output voltage of said first secondary winding without substantially changing the predetermined impedance, including a series transformer having a plurality of windings, a first excitation winding, an auxiliary transformer having a tapped winding, and tap changer means adapted to change taps on said tapped winding,
   said first excitation winding being disposed in the space between the first and second sections of said first secondary winding,
   said first excitation winding being connected across said tapped winding.
   said series transformer having a winding connected serially with said first secondary winding, and a winding connected to said tapped winding through said tap changer means,
   whereby the current flowing through said first excitation winding is responsive to the position of said tap changer means on said tapped winding, changing the effective space between the first and second sections of said first secondary winding in response to tap changes, to substantially oppose changing said predetermined impedance due to tap changes.

2. The load tap changing transformer arrangement of claim 1, including a reversing switch, the winding of the series transformer connected to the tapped winding, being connected thereto through said reversing switch.

3. The load tap changer transformer arrangement of claim 1, including a second secondary winding, having two serially connected, axially spaced sections disposed in inductive relation with the magnetic core, and a second excitation winding, said second excitation winding being disposed in the space between the sections of said second secondary winding, said second excitation winding being connected serially with the first excitation winding, across the tapped winding, the series transformer having a winding connected serially with said second secondary winding, and a winding connected in parallel with its winding connected to the tapped winding.

4. The load tap changing transformer arrangement of claim 3, including a reversing switch, the windings of the series transformer connected to the tapped winding being connected thereto through said reversing switch.

References Cited

UNITED STATES PATENTS

| 3,015,057 | 12/1961 | Alverson | 323—43.5 |
| 3,254,295 | 5/1966 | Vargo et al. | 323—43.5 |
| 3,349,320 | 10/1967 | Mathes | 323—43.5 |

LEE T. HIX, Primary Examiner

G. GOLDBERG, Assistant Examiner

U.S. Cl. X.R.

323—45, 80; 336—147, 150